Feb. 14, 1933.   R. B. RESPESS   1,897,620
CONTINUOUS PROCESS OF REDUCING OR REFORMING WOOD OR OTHER FIBROUS MATERIAL
Filed Jan. 15, 1932   2 Sheets-Sheet 1
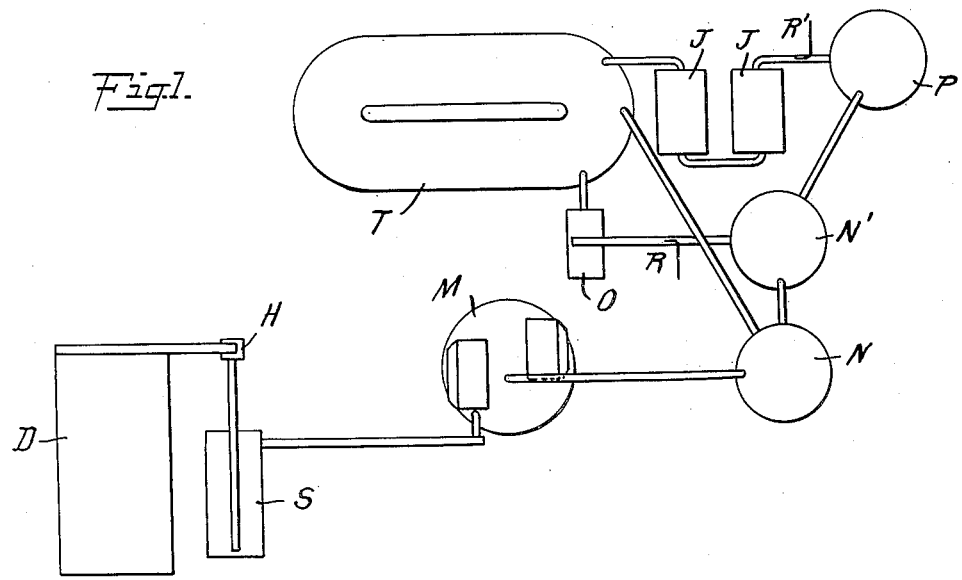
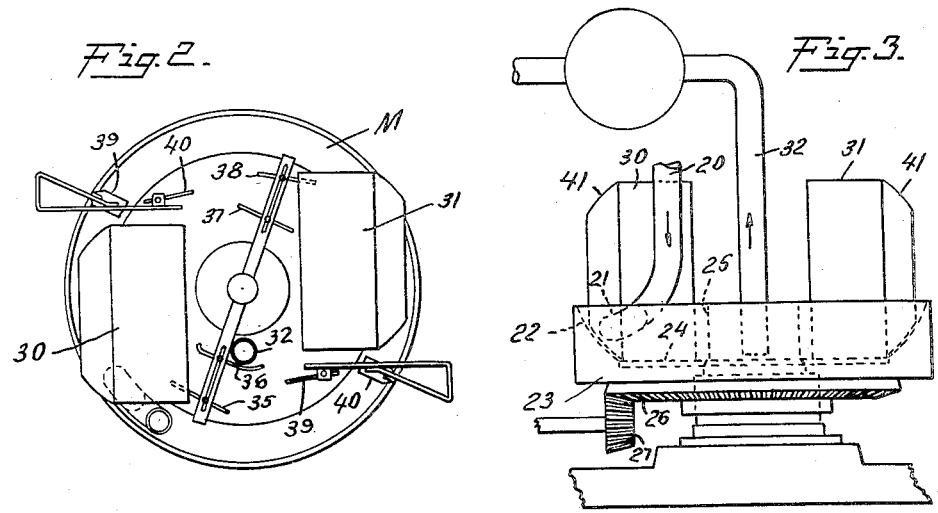
INVENTOR
Roland B. Respess
BY
Marshall & Hawley
ATTORNEYS Feb. 14, 1933. R. B. RESPESS 1,897,620
CONTINUOUS PROCESS OF REDUCING OR REFORMING WOOD OR OTHER FIBROUS MATERIAL
Filed Jan. 15, 1932 2 Sheets-Sheet 2

INVENTOR
Roland B. Respess
BY
Marshall & Hawley
ATTORNEYS

Patented Feb. 14, 1933

1,897,620

UNITED STATES PATENT OFFICE

ROLAND B. RESPESS, OF WICKFORD, RHODE ISLAND, ASSIGNOR TO RESPATS, INC., OF PROVIDENCE, RHODE ISLAND, A CORPORATION OF RHODE ISLAND

CONTINUOUS PROCESS OF REDUCING OR REFORMING WOOD OR OTHER FIBROUS MATERIAL

Application filed January 15, 1932. Serial No. 586,729.

This invention relates to the continuous process of reducing or reforming wood or other fibrous material for use in forming wall or insulating board or like products and to the making of such products.

The quality or grade of vegetable fiber insulating or wall board is determined largely by certain characteristics, namely, by the strength over weight quotient or strength per unit of weight, by the absorption per unit of weight or density, by its insulating efficiency and its ageing qualities. The strength and the insulating efficiency should be high, the absorption should be reasonably low and its resistance to atmospheric conditions good.

These factors are dependent on the structural characteristics of the board and on the composition of the material utilized in making the board. In many of the processes now in use for preparing or reducing fibrous vegetable material, used in forming wall board or like products, the wood is chemically treated or digested in the presence of a chemical that may materially change the resinous content of the wood and in subsequent treatment it may be entirely removed.

The object of cooking wood with chemicals and its subsequent treatment to perform fiber separation is chiefly to secure uniform length of well cleaned fibers used in making paper. An illustration of the condition of such fibers, as regards their absorption is furnished by blotting paper and in order to use such fibers to construct denser paper, that resists disintegration in water, it is necessary to add a size, as for illustration, one composed of rosin which serves only to coat the fiber.

To obtain the best grade or quality of wall or insulating board with a low absorption quotient and long lasting qualities substantially all the unchanged natural wood ingredients should be retained in the final product, including the natural resinous content of the wood. In other words, the board should be composed of raw or substantially unchanged wood elements.

To obtain the greatest strength with high insulating efficiency in wall board, the original ingredients of the dry wood of the species used should be retained and while a portion of short fibers may be used the main bulk should be composed of comparatively long fibers, flexible strings of interconnected fine fibers or expanded bundles of interconnected flexible stringy fibres, rather than be composed of all short isolated or chemically treated fiber, in which may be, in some cases, included bulks of ground or shredded wood surrounded by such short fiber.

In the processes now in use the wood bulks are treated by passing them through various mills, grinders, or other means of reduction until substantially all the material is finely divided. The wood bulks, when entering the process, are unavoidably of varying sizes and when all sizes are subjected to the same treatment much of the material is too greatly reduced, practically is powdered, and when it is included with the other fiber, in forming board, it actually reduces the grade of the product.

Moreover, when all the fibrous material receives the same treatment power is wasted in further treating material after it has been sufficiently reduced.

One of the objects of this invention is to provide a process so worked out that a minimum amount of power will be employed and the power used will not be wasted in continued operation on material which has reached the state of suitable reduction or division, so that all the fiber is suitable and useful for the purpose designated.

Another object of the invention is to provide a continuous process so worked out that the time required for carrying out the process and the power consumed will be reduced to a minimum and a superior product will be obtained.

Another object of the invention is to provide a continuous process so worked out that a maximum amount of the final product will be obtained from a minimum amount of the raw material.

Another object of the invention is to provide a continuous process so worked out that the fibrous material is controllably reduced and divided in predetermined grades of fiber suited to form wall and insulating board or similar products, and such reduction and division is controllable as to the relative quantity of each predetermined grade.

Another object of the invention is to provide a continuous process of the character specified so carried out as to permit a controllable wide latitude of variation in the composition of the final product and to obtain predetermined or regulated properties in the intermixture of and composition of the fibrous material.

Another object of the invention is to provide a process of the character described so carried out that the material may be fed continuously to and through the process and that the period of operation in each step and the nature and amount of treatment can be adjustably controlled.

Another object of the invention is to provide a continuous process of the character described that will be adaptable to the treatment of vegetable fibrous material of all kinds, particularly to all species of woods, including Southern pine of high rosin content.

Another object of the invention is to provide a continuous process of reducing and reconstructing wood or other fibrous vegetable material to form wall and insulating board or similar products so worked out that the final product will retain practically all of the natural rosins or resinous content and other ingredients of dry woods, of the species used, or of other vegetable material.

Another object of the invention is to provide a continuous process of reducing and dividing fibrous vegetable material so carried out that the final product, when formed, will have a high strength over weight quotient, a high insulating efficiency, a low absorption quotient and long lasting qualities.

Another object of the invention is to provide a continuous process of reducing, dividing, combining and reforming fibrous vegetable material in sheets as wall or insulating board and drying the product by combining connected groups of standard or special equipment in a manner to accomplish the required results.

Another object of the invention is to so combine and coordinate the steps and apparatus as to make possible the carrying out of a continuous process whereby raw wood bulks can be suitably reduced and formed into insulating or wall board.

Further objects of the invention will appear from the following specification taken in connection with the drawings which form a part of this application, and in which Fig. 1 is a diagrammatic view illustrating apparatus that may be used to carry out the process;

Fig. 2 is a diagrammatic top plan view of a preferred form of reducing mill utilized in the process;

Fig. 3 is an elevational view of the mill shown in Fig. 2;

Figure 10:
Figure 11:
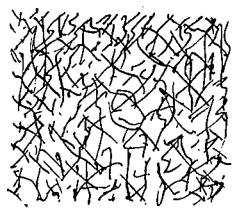

Figs. 4 to 9 inclusive illustrate different conditions of the material at the various stages in the reduction thereof in the process;

Fig. 10 is a somewhat exaggerated view illustrating the condition of the fibrous material after it has passed through the mill; and Fig. 11 illustrates the fibrous material at the final stage of the process.

The invention briefly described consists of a process for treating chipped or shredded fibrous material, such as wood or vegetable fibers, in such a way as to reduce the material to a condition in which it is adapted for use in forming insulating board or wall board and of the production of such material. In carrying out the process the fibrous material is first chipped or shredded and is fed into a mill in which the fibers are split, opened up, spread, kneaded and expanded. The fibrous material in the mill is moist but no free water is present during the operation of the mill. The process therefore is not a wet process. The material is fed continuously into and is continuously withdrawn from the mill, the time and nature of treatment or reduction therein being adjustably controlled.

From the mill the material is passed to an air separator in which the reduced material is selectively graded, the portion which has been sufficiently reduced being fed directly from the separator to a storage or hydrating tank. The other portion of the separated material is passed through further reducing machines or mills in which it is reduced to fibers of the required length and strength and is then fed to the storage tank. Preferably, the portion of the material which is separated and requires further reducing is fed from the first separator to a second separator in which it is divided into two grades, the finer grade being passed through suitable reducing mechanism to the tank and the coarser grade being passed through steaming and softening apparatus and reducing mechanism to the storage tank.

By separating the material which has been reduced in the first mill the power required for carrying out the process is conserved and materially reduced since the portion of the material which has been sufficiently treated is passed directly to the storage tank and further power is consumed only in dividing and reducing the material which requires further treatment. By means of such mechanical treatment the fibrous material retains its natural strength and resinous content and it is possible to form the material into insulating or wall board of predetermined density, weight, strength and insulating qualities at an operating cost sufficiently low to insure the successful production and sale of the product. Furthermore, this process makes possible the reduction of wood bulks of heavy wood, such as Southern pine, and the formation therefrom of a final product, such as insulating or wall board, comparable in strength, quality and quantity with the products formed from lighter species of wood.

Further details of the invention will appear from the following description.

Although the process is not limited to any specific apparatus the drawings illustrate diagrammatically mechanism or machines adapted for carrying out of the process. The wood bulks are first passed through a barking drum D, then through a hog or chipper H and therefrom through a shredder S.

From the shredder the material passes to a reducing mill M which is illustrated diagrammatically in Figs. 2 and 3. The material, in a moist condition, is fed into the mill through a pipe 20 having a discharge end or nozzle 21 positioned to direct the material against an upwardly and outwardly curved outer wall 22 of the bed 23 of the mill. The bed has a horizontal or flat portion 24 and an inner wall 25 and is rotated in a suitable manner as by a gear connection 26, 27.

It will be noted that the bed is trough shaped and the material is reduced by the coaction with the bed or trough of rollers 30 and 31 which are rotatably mounted above the bed on axes offset with relation to each other and with relation to the axis of rotation of the bed. The material is withdrawn from the mill through a pipe 32, as shown in Fig. 2, adjacent the inner wall 25 of the trough or bed. Means is provided for gradually guiding or deflecting the material inwardly from the outer wall toward the inner wall, this means consisting of a plurality of vanes or deflectors 35, 36, 37 and 38 which are so located and so angled as to direct the material inwardly against the action of centrifugal force which tends to keep the material in the outer peripheral portion of the trough. Scrapers 39 and 40 are provided for scraping the material from the bed and turning over and intermixing the material as it is being reduced.

It will be noted that the outer edge portions 41 of the rollers 30 and 31 are inclined or curved in a manner to correspond with the inclined or curved surface of the outer wall 22 of the bed.

Particular attention is directed to the action obtained by the inclined or curved outer edge portions of the rollers acting in conjunction with the inclined or curved outer wall of the trough, since it is between these coacting surfaces that the initial lateral spreading, smearing, splitting, mixing and expanding action on the material is obtained.

It is essential for the reducing action just described that it be carried out without the presence of free water since the fibrous material tends to float on the water and the spreading, splitting and kneading action obtained in this process could not be carried out.

Furthermore, it should be noted that the action obtained in this apparatus is not in any sense grinding or abrading, but the rollers operate successively and intermittently to compress and permit expansion and to effect the spreading of the fibrous material. This action is also materially increased by the offset relation of the rollers relative to each other and to the axis of rotation of the trough or bed. Due to this feature of the construction the material during the operation of the rollers thereon will be subject not only to a rolling action but to a lateral inward and rearward or slipping action which also tends to increase the spreading and splitting of the material.

From the mill M or, if desired, from a battery of mills, the product passes to a separator N, preferably an air separator, which selectively grades the reduced material received from the mill. The portion which has been sufficiently reduced may be passed directly to a storage or hydrating tank T. The other portion is preferably passed to a second separator N' which again divides it into two parts, the more finely divided part being passed with a stream of water indicated at R to a reducing or attrition mill O or a battery of such mills in which this portion is reduced to substantially the consistency or condition of the material which was passed from the separator N to the tank T. From the mill or mills O this material also goes to the tank.

The coarser grade from the separator N' is preferably passed to a steaming or moistening drum or other suitable apparatus P and from the drum this material is passed with a stream of water indicated at R' to a suitable mill or mills J, it having been found desirable to utilize Jordan's J and/or attrition mills for this reducing step. Thence the material is passed to the tank T.

In the tank or tanks T the reduced fiber is thoroughly intermixed in water and from these tanks it passes to the machines on which the wall board or insulating board is formed and is subsequently dried.

Figure 4:
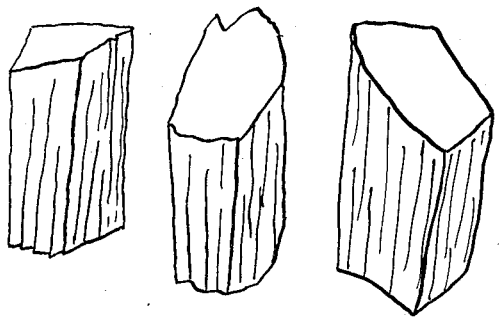
Figure 5:
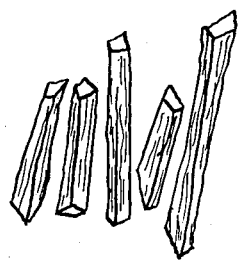

Figs. 4 to 11 inclusive illustrate somewhat roughly the condition of the material at the various stages of reduction or treatment. Fig. 4 shows the material as it passes from the hog H. Fig. 5 shows the shredded material as it passes from the shredder S, this being the condition of the material fed into the reducing mill M.

Figure 6:
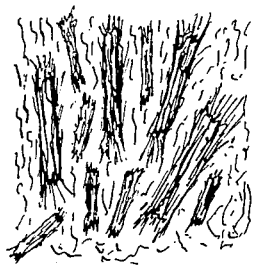
Figure 7:
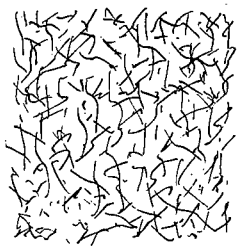
Figure 8:
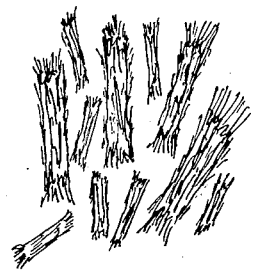
Figure 9:
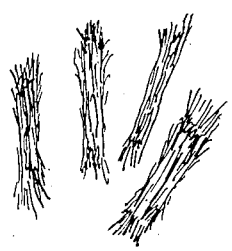

From the reducing mill the material passes to the separator N where it is divided into portions resembling the material shown in Figs. 6 and 7. The finer portion shown in Fig. 7 is passed directly to the storage tank T and the coarser portion shown in Fig. 6 passes to the second separator N' where it is divided up into the grades shown respectively in Figs. 8 and 9. The finer grade is further reduced in the mill or mills O, as shown in Fig. 8, and from these mills passes to the tank T. The coarser grade shown in Fig. 9 is preferably fed to the steam drum or moistening drum P where it is rendered soft and pliable and is fed therefrom through the reducing machines or Jordan's J and thence to the storage tank.

Fig. 10 is an exaggerated view of the fibrous material after it has been split, spread, kneaded and expanded in the mill M. It will be noted that the individual fibers are spread or separated but are interconnected.

Fig. 11 roughly illustrates the final condition of the product of the process or, in other words, the condition of the material in the storage tanks.

From the foregoing description it will be seen that the process which is continuously operated or carried out passes the material through the necessary reducing mechanism, separates the material into two or more grades for subsequent treatment, directs the material sufficiently reduced to the storage tank and gives the other portions of the material the required further reduction necessary to place this material in the best possible condition as to strength and length of fiber for combining with the other portions and use in making products of the character specified.

Particular attention is directed to the importance of treating the fibrous material in a moist state but without the presence of free water since in the process described the material comes from the mill in a loose or open condition and is separated and classified by an air separator.

The usual wet grinding and wet separation are not efficient for processing fibers for insulating or wall board since in order to classify the wet ground material in wet classifiers it is necessary to have approximately ninety-nine percent (99%) of water and not more than one half of one percent (1%) of fiber. If these proportions are not maintained the fibrous material will mat over the screens and nothing will pass through. On the other hand, it is impossible to grind or reduce a mixture of fiber and water of the consistency required for wet separation or classification and therefore water must be added between the grinding mill and the classifier and must be abstracted or taken out between the classifier and the grinder. Moreover, air separation is much more positive and efficient.

Furthermore, by the regulation and control possible by varying the time of treatment and the separation the most desirable combination of lengths of fiber in the final product can be obtained. For instance, it is desirable to have a certain percentage of fine fibers for strength, coarse fibers for insulating value and fibers intermediate these two grades to aid in interlocking or interlacing the fibers. A final product wherein the fibers are all uniform is not as suitable or efficient for wall or insulating board but is more suitable for paper or cardboard where smoothness is essential.

Practically all of the original rosins or resinous content and other natural ingredients of the wood are retained and the insulating or wall board formed with such fibrous material will have the qualities most necessary, namely, strength, high insulating efficiency, law absorption quotient and lasting qualities.

Although one specific process has been particularly described it will be understood that variations in the particular arrangement of steps may be made without departing from the spirit and scope of the invention as expressed in the following claims.

What I claim is:

1. The continuous process of reducing moistened fibrous material without the presence of free water which consists of continuously feeding the material to a reducing mill, reducing the material therein, continuously withdrawing reduced material from said mill, selectively separating and grading said reduced material by air separation without the presence of free water, storing the sufficiently divided and reduced portion of material, further reducing the remaining separated portions of the material, and combining and intermixing the further reduced portions with said first reduced portion.

2. The continuous process of reducing moistened fibrous material without the presence of free water which consists of continuously feeding the material in its natural, uncooked and undigested state to a reducing mill, reducing the material therein, continuously withdrawing reduced material from said mill, selectively separating and grading said reduced material by air separation without the presence of free water, storing the sufficiently divided and reduced portion of material, further reducing the remaining separated portions of the material, and combining and intermixing the further reduced portions with said first reduced portion.

3. The continuous process of reducing fibrous material which consists of continuously feeding the material to a reducing mill, splitting, spreading and kneading and reducing the material therein without the presence of free water, continuously withdrawing reduced material from said mill, selectively separating and grading said reduced material by air separation, storing the sufficiently divided and reduced portion of material, further reducing the remaining separated portions of the material, and combining and intermixing the further reduced portions with said first reduced portion.

4. The continuous process of reducing fibrous material which consists of continuously feeding shredded, moistened fibrous material to a reducing mill, reducing the material therein, continuously withdrawing reduced material from said mill by suction, selectively separating and grading said reduced material by air separation, storing the sufficiently divided and reduced portion of material, further reducing the remaining separated portions of the material, and combining and intermixing the further reduced portions with said first reduced portion.

5. The continuous process of reducing fibrous material which consists of continuously feeding the material to a reducing mill, reducing the material therein, continuously withdrawing reduced material from said mill by suction, selectively separating and grading said reduced material by air separation, storing the sufficiently divided and reduced portion of material, further separating the remaining portions of the material, further and selectively reducing the said remaining separated portions of the material, and combining and intermixing the further reduced portions with said first reduced portion.

6. The continuous process of reducing moistened fibrous material without the presence of free water which consists of continuously feeding shredded, moistened fibrous material to a reducing mill, reducing the material therein, continuously withdrawing reduced material from said mill, selectively separating and grading said reduced material by air separation, storing the sufficiently divided and reduced portion of material, permeating and hydrating and further reducing other separated portions of the material, and combining and intermixing the further reduced portions with said first reduced portion.

7. The continuous process of reducing moistened fibrous material which consists of continuously feeding the material to a reducing mill, reducing the material therein without the presence of free water, continuously withdrawing reduced material from said mill, selectively separating and grading said reduced material by air separation, storing the sufficiently divided and reduced portion of material, hydrating or moistening a portion of said separated portion, further and selectively reducing the said remaining separated portions of the material, and combining and intermixing the further reduced portions with said first reduced portion.

8. The continuous process of reducing moistened fibrous material which consists of continuously feeding the material in its natural, uncooked and undigested state to a reducing mill, reducing the material therein without the presence of free water, continuously withdrawing reduced material from said mill by suction, selectively separating and grading said reduced material by air separation, storing the sufficiently divided and reduced portion of material, further reducing the remaining separated portions of the material, and combining and intermixing the further reduced portions with said first reduced portion.

ROLAND B. RESPESS.